United States Patent [19]
Enomoto et al.

[11] 3,901,947
[45] Aug. 26, 1975

[54] PRODUCTION OF 2,6-XYLENOL

[75] Inventors: Saburo Enomoto; Masami Inoue, both of Toyama, Japan

[73] Assignee: Arakawa Rinsan Kagaku Kogyo Kabushiki Kaisha, Osaka, Japan

[22] Filed: Oct. 1, 1969

[21] Appl. No.: 862,925

[30] Foreign Application Priority Data
Oct. 28, 1968 Japan.............................. 43-78746

[52] U.S. Cl............................. 260/621 R; 252/462
[51] Int. Cl.²......................................... C07C 37/16
[58] Field of Search...... 260/621 R, 624 C; 252/462

[56] References Cited
UNITED STATES PATENTS
3,280,201   10/1966   Hamilton et al............. 260/624 C X
3,331,879   7/1967    Leston........................... 260/624 C
3,347,936   10/1967   Froitzheim et al............. 260/621 R
3,446,856   5/1969    Hamilton..................... 260/621 R X

*Primary Examiner*—Norman P. Morgenstern
*Attorney, Agent, or Firm*—Bernard Olcott

[57] ABSTRACT

A process for the production of 2,6-xylenol which comprises reacting at least one reactant selected from the group consisting of phenol and ortho-cresol with methanol in the vapor phase in the presence of a catalyst system selected from the group consisting of calcined mixtures of cerium oxide and magnesium oxide and calcined mixtures of cerium oxide, manganese oxide and magnesium oxide.

4 Claims, No Drawings

PRODUCTION OF 2,6-XYLENOL

This invention relates to a process for the production of 2,6-xylenol, namely 2,6-dimethyl phenol in a commercially advantageous manner by reacting phenol and/or ortho-cresol with methanol in the vapor phase in the presence of a new catalyst system which has a higher catalytic selectivity as well as a long lasting or durable catalytic activity.

It is known that 2,6-xylenol may be produced by ortho-methylating phenol and/or ortho-cresol with methanol in the vapor phase in the presence of a catalyst consisting of a single metal oxide. For the catalytic metal oxide, it has been proposed to use the oxide of magnesium, aluminum, calcium, manganese, iron, zinc, zirconium, barium or thorium (British Pat. No. 717,588). The catalyst which has normally been used for the production of 2,6-xylenol consists of a single metal oxide which is anyone of the above-mentioned metal oxides. However, it has been found that such catalyst consisting of a single metal oxide is not satisfactory with respect to its catalytic selectivity and to its durability of catalytic activity, when this catalyst is used in the commercial production of 2,6-xylenol.

For instance, when aluminum oxide alone is used as the catalyst for the production of 2,6-xylenol, the conversion of the starting phenol and/or ortho-cresol is somewhat high whereas the selectivity to produce the desired 2,6-xylenol is very much low with formation of large quantities of undesired by-products such as the isomeric 2,3-, 2,4- and 2,5-xylenols, meta- and para-cresols and trimethyl phenols etc. Further when the simple magnesium oxide catalyst is used, it has usually been found that the formation of relatively large quantities of by-products such as anisole and trimethyl phenols etc. is companied in the initial stage of the reaction and that the activity of the catalyst can be decreased considerably and hence the conversion of the starting material can be reduced in the later stage of the reaction of prolonged periods, though the selectivity of the catalyst may then increase more or less.

Similarly, the simple manganese oxide catalyst suffers from a poor catalytic activity and poor durability of the activity, and it is not advantageous to employ the manganese oxide catalyst for the commercial production of 2,6-xylenol.

Accordingly, an object of the present invention is to provide a process for the production of 2,6-xylenol by which a commercial production of 2,6-xylenol may be performed with advantage by reacting phenol and/or ortho-cresol with methanol in the vapor phase. Another object of the present invention is to provide a new and useful catalyst system which can exhibit better activity, selectivity and durability of the catalytic activity in combination when used in the commercial production of 2,6-xylenol by the vapor phase reaction of phenol and/or ortho-cresol with methanol.

Surprisingly we have now found that the above objects of the present invention may be achieved satisfactorily when the vapor phase reaction of phenol and/or ortho-cresol with methanol is carried out using a binary catalyst system consisting of a calcined mixture of cerium oxide and magnesium oxide or a ternary catalyst system consisting of a calcined mixture of cerium oxide, manganese oxide and magnesium oxide.

According to the present invention, therefore, there is provided a process for the production of 2,6-xylenol, characterised in that phenol and/or ortho-cresol is or are reacted with methanol in the vapor phase in the presence of a catalyst system consisting of a calcined mixture of cerium oxide and magnesium oxide or a catalyst system consisting of a calcined mixture of cerium oxide, manganese oxide and magnesium oxide.

When the process of the present invention is carried out using phenol as the starting material, it may be observed that the reaction products contain a predominant proportion of the desired 2,6-xylenol together with a minor proportion of ortho-cresol by-formed. When the process of the present invention is effected using ortho-cresol as the starting material, it may be noted that the reaction products contain a predominant proportion of the desired 2,6-xylenol together with a minor proportion of phenol which has been by-produced through the dealkylation of the ortho-cresol. In either case, the reaction products contain substantially no or little by-product other than the above-mentioned ortho-cresol and phenol. However, these by-produced ortho-cresol and phenol may easily be separated from the reaction products and recycled to the process for re-use in the feedstock, so that essentially the process of the present invention can maintain the overall yield of 2,6-xylenol at a very much higher level. Furthermore, the overall yield of 2,6-xylenol may be maintained at a very much high level throughout a prolonged run of the reaction.

In this specification, the term "the reaction products" is meant the whole of the phenol derivatives which have been formed from the consumed starting phenol and/or ortho-cresol, excluding the unreacted starting phenol and/or ortho-cresol and the unreacted methanol as well as the water formed in the reaction.

The catalyst systems used according to the present invention may be prepared in various ways: For instance, the cerium oxide-magnesium oxide catalyst system may be prepared by mixing one or more of the oxide, hydroxide, carbonate, bicarbonate or the like of magnesium with an aqueous solution comprising one or more of the nitrate, carbonate, bicarbonate, hydroxide or oxide etc. of cerium to give a paste and firing or calcining this mixture at a high temperature of about 300°C to 600°C for several hours, usually for 3 to 8 hours in air, oxygen, oxygen-containing gases and the like. The cerium oxide-manganese oxide-magnesium oxide catalyst system may be prepared by mixing one or more of the nitrate, carbonate, hydroxide or oxide of manganese etc. with the above-mentioned paste and calcining the resulting admixture under similar conditions. The catalyst systems of the present invention may, of course, be prepared by any manner other than the above-mentioned procedures, for example, by heating a mixture comprising halides or organic acid salts of the metals in air, oxygen or oxygen-containing gases. If desired, the catalyst systems of the present invention may be prepared in any form of beads, granules and pellets e.g. by shaping the paste into an appropriate form prior to the calcination.

The cerium oxide-magnesium oxide catalyst system according to the present invention is advantageously characterised by its high selectivity, as the reaction products contain at least 90% by weight of 2,6-xylenol when this catalyst is used for the reaction of phenol and/or ortho-cresol with methanol. In this binary catalyst system, the ratio of cerium oxide to magnesium oxide is not critical but may vary over a wide range.

owever, it is usually preferred that the ratio of cerium oxide to magnesium oxide is within a range of from about 1:0.1 to about 1:10 by weight. With the cerium oxide-manganese oxide-magnesium oxide catalyst system according to the present invention, it is advantageous not only in its high selectivity but also in its durable and high activity because it ensures that the conversion of the starting material may constantly be maintained at 80% or more throughout prolonged period of the reaction. In this trinary catalyst system, the ratio among the cerium oxide, manganese oxide and magnesium oxide is not critical, too and may vary over a wide range. However, it is generally preferred that the ratio of cerium oxide to manganese oxide is within a range of about 1:0.05 to about 1:10 by weight and that the ratio of cerium oxide to magnesium oxide is within a range of about 1:0.1 to about 1:10 by weight.

In carrying out the production of 2,6-xylenol according to the present invention, there may be employed any reaction apparatus of conventional design which has been used generally for the known vapor phase reactions. For instance, the process of the present invention may be carried out in a reactor fitted with a preheater and containing a catalyst zone in such a manner that phenol and/or ortho-cresol is or are introduced together with methanol into the preheater and vaporised therein and that the resulting gaseous mixture of the reactants together with an inert carrier gas such as nitrogen is then continuously passed into and through the reactor in contact with the catalyst and with external application of heat. The vapors or gaseous crude reaction products leaving the reactor are collected and condensed in a cooler which is kept at room temperature or a lower temperature. The condensate so obtained comprises the unreacted starting methanol, the unreacted starting phenol and/or ortho-cresol as well as the water formed in the reaction, the phenol derivatives which have been formed from the conversion of the starting phenol and/or ortho-cresol, and the by-produced ortho-cresol or phenol etc. This condensate is distilled to remove fractions of boiling points of less than about 110°C. The residual fractions which have boiling point of not less than about 110°C and have been freed from the unreacted methanol and the formed water may exhibit a high content of 2,6-xylenol. This residual fractions of boiling points of not less than 110°C may conventionally be treated to recover the unreacted starting phenol and/or ortho-cresol, and it may further be purified by a usual method such as fractional distillation, recrystallization or extraction etc., if it is desired to recover a much purer 2,6-xylenol. The temperature in the preheater may be enough to vaporise the reactants phenol and/or ortho-cresol and methanol completely, and it may usually be in the order of 180° to 250°C. The reaction temperature in the reactor varies depending on the kind and composition of the catalyst system used but it may suitably be at 300° to 550°C and preferably at 350° to 450°C. The reaction pressure may normally be atmospheric but it may be super-atmospheric or sub-atmospheric, if desired.

When phenol is reacted with methanol according to the process of the present invention, the molar ratio of phenol to methanol may suitably be within a range of 1:2 to 1:10 in the feedstock to be passed into the reactor. When ortho-cresol is reacted with methanol, the molar ratio of ortho-cresol to methanol may be within a range of 1:1 to 1:6 in the feedstock. It is usually preferable that the space velocity of the feedstock passing through the reactor is within a range of 100 cc. to 800 cc. per hour per cc. of the catalyst volume.

The 2,6-xylenol as produced by the process of the present invention is very much useful as the starting material for the manufacture of polyether resins such as polyphenylene oxide and for the preparation of antioxidant, preservatives, herbicides and others.

The present invention is now illustrated with reference to the following Examples but to which the present invention is not limited.

EXAMPLE 1 (COMPARATIVE)

A mixture containing ortho-cresol and methanol at a molar ratio of 1:3 was passed into and vaporised in a preheater at 220°C while nitrogen gas was introduced as a separate stream into the preheater. The resulting gaseous mixture of ortho-cresol, methanol and nitrogen was then continuously passed into a reactor at a space velocity of 300 cc./hr./cc., the reactor containing a catalyst bed which consisted of magnesium oxide alone and which had been heated to 400°C. This magnesium oxide catalyst was prepared by mixing magnesium hydroxide with water to give a paste and calcining the paste at 450°C for 6 hours. The gases leaving the reactor were collected in a cooler which was cooled down to about −20°C. The resulting condensate was distilled to remove the fractions of boiling points of less than about 110°C, and the residual fraction was then analysed.

Two hours after the start of the reaction, it was found that the conversion of the ortho-cresol was 73.2% and that the reaction products then contained 86.6% by weight of 2,6-xylenol together with 13.4% by weight of total 2,4- and 2,5-xylenols by-produced. Sixteen hours after the start of the reaction, it was observed that the conversion of ortho-cresol had been decreased to 28.4%, when the reaction products contained 100% by weight of 2,6-xylenol.

EXAMPLE 2 (COMPARATIVE)

Diatomaceous earth was impregnated with an aqueous solution of cerium nitrate and then calcined at 450°C for 6 hours. The single cerium oxide catalyst so obtained was used to carry out the vapor phase reaction of phenol with methanol. The reaction conditions employed were the same as in Example 1 except that the feedstock to be passed into the reactor contained phenol and methanol in a molar ratio of 1:5.

Two hours after the start of the reaction, it was noted that the conversion of phenol was 40.5% and that the reaction products then contained 14.7% by weight of 2,6-xylenol together with 78.2% by weight of ortho-cresol and 7.1% by weight of the other by-products. Sixteen hours after the start of the reaction, it was found that the conversion of phenol was decreased to 37.1% and that the reaction products contained an approximately similar amount of 2,6-xylenol together with similar quantities of the by-products.

EXAMPLE 3

The procedure of Example 1 was repeated in the same conditions except that a catalyst system consisting of a calcined mixture of 3 parts by weight of cerium oxide and 7 parts by weight of magnesium oxide was used in stead of the simple magnesium oxide catalyst of Example 1.

The above-mentioned cerium oxide-magnesium oxide catalyst system was prepared by mixing magnesium hydroxide with an aqueous solution of cerium nitrate and firing the resultant paste at 500°C for 6 hours.

Two hours after the start of the reaction, it was found that the conversion of ortho-cresol was 57.2% and that the reaction products then contained 99.1% by weight of 2,6-xylenol together with 0.9% by weight of phenol which was by-produced. 24 Hours after the start of the reaction, it was found that the conversion remained at 45.1%, when the reaction products contained 100% by weight of 2,6-xylenol.

EXAMPLE 4

The procedure of Example 1 was repeated in the same manner except that a catalyst system consisting of a calcined mixture of 10 parts by weight of cerium oxide, 1 part by weight of manganese oxide and 10 parts by weight of magnesium oxide was used in place of the simple magnesium oxide catalyst.

The above-mentioned cerium oxide-manganese oxide-magnesium oxide catalyst system was prepared by mixing magnesium oxide with an aqueous solution containing cerium nitrate and manganese nitrate and then calcining the resulting paste at 500°C for 6 hours.

Two hours after the start of the reaction, it was determined that the conversion of ortho-cresol was 83.6% and that the reaction products then contained 89.1% by weight of 2,6-xylenol together with 10.9% by weight of by-produced phenol. 24 Hours after the start of the reaction, determination of the conversion and the content of 2,6-xylenol in the reaction products showed still similar results.

EXAMPLE 5

A gaseous mixture containing phenol and methanol at a molar ratio of 1:5 was continuously passed at a rate of about 3 cc./minute into a reactor containing about 550 cc. of a catalyst system which consisted of a calcined mixture of 1 part by weight of cerium oxide, 1 part by weight of manganese oxide and 2 parts by weight of magnesium oxide. This catalyst system used was prepared in the same way as the catalyst system used in Example 4. The reaction temperature was kept at 400° to 410°C throughout the reaction. During the reaction, a carrier nitrogen gas was also fed into the reactor along the reactant mixture. The reaction was effected continuously for a long period of time. The conversion of phenol and the content of 2,6-xylenol in the reaction products were determined at intervals of about 50 hours. The results obtained are shown in Table below.

Table

| Reaction duration (Hour) | Conversion of phenol (%) | Content of 2,6-xylenol (% by weight) |
|---|---|---|
| 2 | 99.9 | 77.1 |
| 50 | 99.5 | 80.8 |
| 100 | 98.7 | 82.6 |
| 150 | 99.3 | 89.0 |
| 200 | 99.7 | 86.8 |
| 250 | 99.4 | 88.5 |

In comparison of the results of Examples 1 and 2 (comparative) with the results of Examples 3 to 5 (the present invention), it is apparent that the catalyst systems used according to the present invention enable the conversion of the starting material as well as the selectivity for the production of desired 2,6-xylenol to be maintained at remarkably higher levels for prolonged periods, so that the productivity of 2,6-xylenol may be remarkably improved, as compared with when the simple magnesium oxide or cerium oxide catalyst is used.

What is claimed is:

1. A process for the production of 2,6-xylenol which comprises reacting at a temperature of between 300°C. to 550°C. at least one reactant selected from the group consisting of phenol and ortho-cresol with methanol in the vapor phase in the presence of a catalyst system which is a calcined mixture of cerium oxide, manganese oxide, and magnesium oxide in the ratio of 1:0.05:0.1 to 1:10:10 by weight, the space velocity of the reactants being in the range of 100 to 800 cc. of reactants per hour per cc. of catalyst and the molar ratio of the reactants being in the range 1:2 to 1:10 of phenol to methanol when methanol is reacted with phenol and in the range of 1:1 to 1:6 of ortho-cresol to methanol when methanol is reacted with ortho-cresol.

2. A process as claimed in claim 1 in which the reaction temperature is maintained in a range of 350° to 450°C.

3. A process as claimed in claim 1 wherein a gaseous feedstock containing phenol and methanol at a molar ratio of 1:2 to 1:10 is brought into contact with said catalyst system.

4. A process as claimed in claim 1 wherein a gaseous feedstock containing ortho-cresol and methanol at a molar ratio of 1:1 to 1:6 is brought into contact with the catalyst system.

* * * * *